United States Patent
Liu et al.

(10) Patent No.: US 11,923,734 B2
(45) Date of Patent: Mar. 5, 2024

(54) COUNTER-ROTATING MOTOR AND HIGH SPEED BLENDER

(71) Applicants: GUANGDONG MIDEA WHITE HOME APPLIANCE TECHNOLOGY INNOVATION CENTER CO., LTD., Foshan (CN); MIDEA GROUP CO., LTD., Foshan (CN)

(72) Inventors: Yi Liu, Foshan (CN); Jianxing Zhao, Foshan (CN); Fei Wang, Foshan (CN)

(73) Assignees: GUANGDONG MIDEA WHITE HOME APPLIANCE TECHNOLOGY INNOVATION CENTER CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 396 days.

(21) Appl. No.: 17/417,074

(22) PCT Filed: Dec. 6, 2019

(86) PCT No.: PCT/CN2019/123812
§ 371 (c)(1),
(2) Date: Jun. 21, 2021

(87) PCT Pub. No.: WO2020/134986
PCT Pub. Date: Jul. 2, 2020

(65) Prior Publication Data
US 2022/0060095 A1    Feb. 24, 2022

(30) Foreign Application Priority Data
Dec. 24, 2018 (CN) .......................... 201811584295.6

(51) Int. Cl.
*H02K 16/02* (2006.01)
*A47J 43/08* (2006.01)
*H02K 11/33* (2016.01)

(52) U.S. Cl.
CPC ............ *H02K 16/02* (2013.01); *A47J 43/085* (2013.01); *H02K 11/33* (2016.01)

(58) Field of Classification Search
CPC ........ A47J 43/085; H02K 16/02; H02K 11/33
(Continued)

(56) References Cited

U.S. PATENT DOCUMENTS

| | | | | |
|---|---|---|---|---|
| 3,445,699 A | * | 5/1969 | Beaudry | ................ H02K 17/30 |
| | | | | 310/125 |
| 2013/0093276 A1 | | 4/2013 | Kim | |
| 2015/0318805 A1 | | 11/2015 | Kim et al. | |

FOREIGN PATENT DOCUMENTS

| | | | | |
|---|---|---|---|---|
| CN | 2778376 | * | 5/2006 | ................ B01F 7/18 |
| CN | 2850122 | * | 12/2006 | ............. H02K 16/02 |

(Continued)

OTHER PUBLICATIONS

The first office action of CN Application No. 201811584295.6, dated Apr. 11, 2019 (16 pages).
(Continued)

*Primary Examiner* — Terrance L Kenerly

(57) ABSTRACT

A counter-rotating motor and a high speed blender is described. The counter-rotating motor includes a stator, an inverter, an inner rotor and an outer rotor, the stator is provided with an outer winding and an inner winding, and the outer winding and the inner winding have opposite phase sequences, the inverter is connected in parallel with the outer winding and the inner winding to synchronously supply excitation current to the outer winding and the inner winding, the inner rotor is provided in the inner winding and is used for rotating in a first direction under the effect of the (Continued)

inner winding, and the outer rotor is provided in the outer winding and is used for rotating in a second direction opposite to the first direction under the effect of the outer winding.

10 Claims, 3 Drawing Sheets

(58) Field of Classification Search
 USPC .................................................. 310/68 D
 See application file for complete search history.

(56) References Cited

FOREIGN PATENT DOCUMENTS

| CN | 2850122 | A |   | 12/2006 |   |   |
|----|---------|---|---|---------|---|---|
| CN | 101710769 | A |   | 5/2010 |   |   |
| CN | 101090221 | B |   | 1/2011 |   |   |
| CN | 102832770 | A |   | 12/2012 |   |   |
| CN | 102832771 | A |   | 12/2012 |   |   |
| CN | 103475160 | A |   | 12/2013 |   |   |
| CN | 104009602 | A |   | 8/2014 |   |   |
| CN | 106329859 | A |   | 1/2017 |   |   |
| CN | 107078570 | A |   | 8/2017 |   |   |
| CN | 107302296 |   | * | 10/2017 | ............. | H02K 41/03 |
| CN | 108400689 | A |   | 8/2018 |   |   |
| CN | 109066928 | A |   | 12/2018 |   |   |
| CN | 208257636 | U |   | 12/2018 |   |   |
| CN | 109546827 | A |   | 3/2019 |   |   |
| DE | 102012109875 | A1 | * | 4/2013 | ............. | H02K 1/276 |
| EP | 0947622 | A2 |   | 10/1999 |   |   |
| GB | 2314093 | A |   | 12/1997 |   |   |
| JP | 2002359953 | A |   | 12/2002 |   |   |
| JP | 2018027008 | A |   | 2/2018 |   |   |
| KR | 19990076570 | A |   | 10/1999 |   |   |
| KR | 20110139433 | A |   | 12/2011 |   |   |
| KR | 20110139434 | A |   | 12/2011 |   |   |
| KR | 20130091589 |   | * | 8/2013 | ............. | H02K 15/10 |
| WO | 2011131416 | A2 |   | 10/2011 |   |   |

OTHER PUBLICATIONS

International search report of PCT/CN2019/123812, dated Mar. 3, 2020 (14 pages).
Notification to Grant Patent Right for Invention for CN Application No. 201811584295.6, dated Jul. 20, 2020 (6 pages).
Korean Request for the Submission of an Opinion dated Mar. 15, 2023 for application No. 10-2021-7019645.
Second Office Action dated Jul. 24, 2023 for Canada Application No. 3,121,950.
European search report for EP Application No. 19903999.1, dated Dec. 8, 2021 (8 pages).
Japanese Decision to Grant a Patent, JP Application No. 2021-534147, dated Jun. 28, 2022 (5 pages).
Notice of Allowance received in KR Application No. 10-2021-7019645; dated Sep. 25, 2023.

* cited by examiner

COUNTER-ROTATING MOTOR AND HIGH SPEED BLENDER

CROSS-REFERENCES TO RELATED APPLICATIONS

The present disclosure is a national phase application of International Application No. PCT/CN2019/123812, filed on Dec. 6, 2019, which claims foreign priority to Chinese Patent Application No. 201811584295.6, filed on Dec. 24, 2018, the entireties of which are herein incorporated by reference.

FILED

The described embodiments relate to the field of motor, and in particular to a counter-rotating motor and a high speed blender.

BACKGROUND

Currently, motors of most high speed blenders in the market each generally has only one output shaft with a stirring blade fitted on. As rotation speed of the stirring blade increases, noise produced during the operation of a high speed blender also increases.

During a long period of research and development, inventors of the present disclosure found that using a counter-rotating motor as a motor of the high speed blender can make stirring blades mounted to two output shafts counter-rotate relative to each other, and improving the stirring effect and producing less noise. At present, in a traditional counter-rotating motor, a brush and a slip ring are used to drive two rotating shafts to rotate in opposite directions. However, noise generated by the brush is high and wear to the brush is serious, thus affecting motor life. In a two-rotor permanent magnet motor, two inverters are used to control two sets of stator and rotor for counter-rotation. In this configuration, although the brush is eliminated, the inverters are costly, complicated to control, and take up a lot of space.

SUMMARY

The present disclosure provides a counter-rotating motor and a high speed blender to solve problems of high noise made by the counter-rotating motor and complicated control in related art.

In order to solve the above problems, the present disclosure may provide a counter-rotating motor. The counter-rotating motor may include a stator, an inverter, an inner rotor and an outer rotor.

The stator may include an outer winding and an inner winding. A phase sequence of the outer winding may be reverse to a phase sequence of the inner winding.

The inverter may be connected in parallel with the outer winding and the inner winding and configured to supply excitation current to the outer winding and the inner winding synchronously.

The inner rotor may be arranged at an inner side of the inner winding and configured to rotate in a first direction by an action of the inner winding.

The outer rotor may be arranged at an outer side of the outer winding and configured to rotate in a second direction opposite to the first direction by an action of the outer winding.

The outer winding may include a three-phase winding. The inner winding may include a three-phase winding. A phase sequence of the three-phase winding in the outer winding may be reverse to a phase sequence of the three-phase winding in the inner winding.

The outer winding may include three-phase windings. The inner winding may include three-phase windings. Each three-phase winding of the outer winding may have a same phase sequence. Each three-phase winding of the inner winding may have a same phase sequence.

Each three-phase winding may include an A-phase winding, a B-phase winding, and a C-phase winding. The A-phase winding, B-phase winding, and C-phase winding of the inner winding may be sequentially arranged in a counterclockwise direction. The A-phase winding, B-phase winding, and C-phase winding of the outer winding may be sequentially arranged in a clockwise direction.

The inverter may include a first current output terminal, a second current output terminal, and a third current output terminal. The A-phase winding of the outer winding may be connected to the first current output terminal in parallel with the A-phase winding of the inner winding. The B-phase winding of the outer winding may be connected to the first current output terminal in parallel with the B-phase winding of the inner winding. The C-phase winding of the outer winding may be connected to the first current output terminal in parallel with the C-phase winding of the inner winding.

One of the inner rotor and the outer rotor may be a first squirrel cage rotor. Another of the inner rotor and the outer rotor may be a second squirrel cage rotor, a permanent magnet rotor, or a reluctance rotor.

The inverter may be configured to perform a closed-loop vector control of the second squirrel cage rotor, permanent magnet rotor, or reluctance rotor. The first squirrel cage rotor may be configured to automatically operate in a V/F open-loop control mode.

The stator may include an inner stator and an outer stator disposed on a periphery of the inner stator. The inner winding may be arranged on the inner stator. The outer winding may be arranged on the outer stator.

The counter-rotating motor may further include a magnetic barrier. The magnetic barrier may be disposed between the outer stator and the inner stator and may be configured to magnetically isolate the outer winding from the inner winding.

In order to solve the above problems, the present disclosure provides a high speed blender. The high speed blender may include a counter-rotating motor as described above.

The high speed blender may further include a first blade and a second blade. The first blade may be connected to the inner rotor. The second blade may be connected to the outer rotor and the first blade and the second blade can counter-rotate relative to each other.

In the present disclosure, the counter-rotating motor may include an inner winding and an inner rotor matched with each other and an outer winding and an outer rotor matched with each other. In addition, one inverter may be configured to control the outer winding and the inner winding synchronously. In this way, the brush can be eliminated, the noise can be reduced, the motor life can be increased, and since two inverters are not required, the cost can be lower and the control can be simpler.

BRIEF DESCRIPTION OF THE DRAWINGS

The embodiments of the present disclosure more clear, the drawings used for the description of the embodiments will be briefly described. Apparently, the drawings described below are only for illustration but not for limitation.

DETAILED DESCRIPTION OF THE DISCLOSURE

The embodiments of the present disclosure may be clearly and comprehensively described by referring to accompanying figures of the embodiments.

Figure 1:
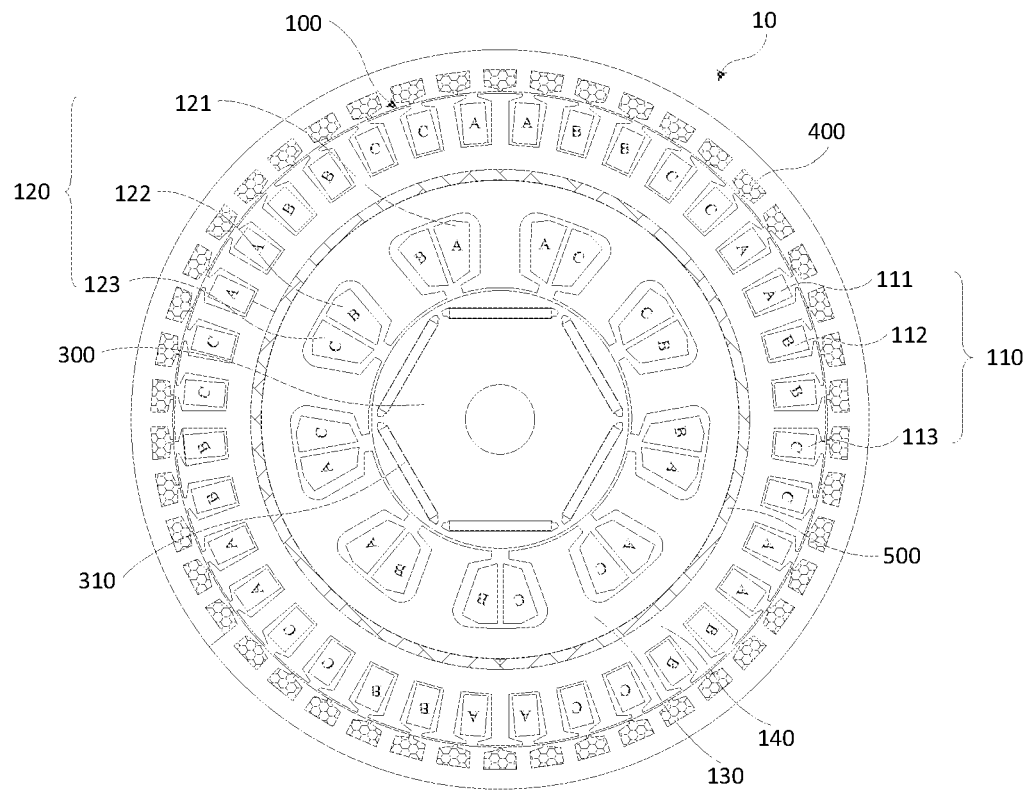
FIG. 1 is a structural view of a counter-motor according to an embodiment of the present disclosure.
Figure 2:
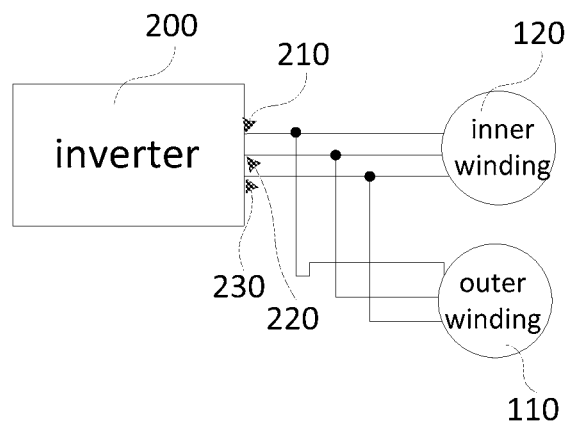
FIG. 2 is a structural view of a counter-motor according to an embodiment of the present disclosure.

As shown in FIGS. 1-2, a counter-rotating motor in an embodiment of the present disclosure may include a stator 100, an inverter 200, an inner rotor 300 and an outer rotor 400. The stator 100 may include an outer winding 110 and an inner winding 120. A phase sequence of the outer winding 110 may be reverse to a phase sequence of the inner winding 120. The inverter 200 may be connected in parallel with the outer winding 110 and the inner winding 120 to supply excitation current to the outer winding 110 and the inner winding 120 synchronously. The inner rotor 300 may be arranged at an inner side of the inner winding 120 and configured to rotate in a first direction by an action of the inner winding 120. The outer rotor 400 may be arranged at an outer side of the outer winding 110 and configured to rotate in a second direction opposite to the first direction by an action of the outer winding 110.

The counter-rotating motor 10 in this embodiment of the present disclosure may include an inner winding 120 and an inner rotor 300 matched with each other and an outer winding 110 and an outer rotor 400 matched with each other. In addition, one inverter 200 may be configured to control the outer winding 110 and the inner winding 120 synchronously. In this way, the brush can be eliminated, the noise can be reduced, and the motor life can be increased, and since two inverters are not required, the cost can be lower and the control can be simpler.

One of the inner rotor 300 and the outer rotor 400 may be a first squirrel cage rotor, and another of the inner rotor 300 and the outer rotor 400 may be a second squirrel cage rotor, a permanent magnet rotor, or a reluctance rotor. The inverter 200 may be configured to perform a closed-loop vector control of the second squirrel cage rotor, permanent magnet rotor, or reluctance rotor. The first squirrel cage rotor may be configured to automatically operate in a V/F open-loop control mode. In one embodiment, the closed-loop vector control means that rotation speed and torque of the motor may be controlled separately, and output voltages may be generated to match different loads in response to received feedback signals. A V/F open-loop control means that a ratio of output voltage V to operating frequency F may be a constant value, and a feedback signal may not be received, thus the output voltage may not be affected by the load.

For example, in this embodiment, the outer rotor 400 may be a first squirrel cage rotor and the inner rotor 300 may be a permanent magnet rotor. A permanent magnet 310 may be embedded within or attached to a surface of the permanent magnet rotor. The inverter 200 may perform a closed-loop vector control of the permanent magnet rotor and the first squirrel cage rotor can automatically operate in the V/F open-loop control mode. For example, in other embodiments, the inner rotor 300 may be a first squirrel cage rotor and the outer rotor 400 may be a second squirrel cage rotor. The inverter 200 may perform the closed-loop vector control of the second squirrel cage rotor and the open-loop V/F control of the first squirrel cage rotor can be achieved.

In embodiments of the present disclosure, one of the inner rotor 300 and the outer rotor 400 may be the first squirrel cage rotor, to overcome the disadvantage that two rotors in a dual rotor motor with dual permanent magnet rotors, dual reluctance rotors or a permanent magnet rotor and a reluctance rotor may be controlled separately by two inverters, thus realizing the control of the two rotors, the inner rotor 300 and the outer rotor 400, by one inverter 200.

The outer winding 110 and the inner winding 120 may each include a three-phase winding. A phase sequence of the three-phase winding in the outer winding 110 may be reverse to a phase sequence of the three-phase winding in the inner winding 120, and the inner rotor 300 corresponding to the inner winding 120 and the outer rotor 400 corresponding to the outer winding 110 may rotate in opposite directions.

In this embodiment, the outer winding 110 and the inner winding 120 may each include three-phase windings. Each three-phase winding of the outer winding 110 may have a same phase sequence. Each three-phase winding of the inner winding 120 may have a same phase sequence. In this way, the inner rotor 300 corresponding to the inner winding 120 or the outer rotor 400 corresponding to the outer winding 110 can continuously rotate in a same direction.

In one embodiment, the three-phase winding may include an A-phase winding, a B-phase winding, and a C-phase winding. In this embodiment, an A-phase winding 121, a B-phase winding 122, and a C-phase winding 123 in the inner winding 120 may be sequentially arranged in a counterclockwise direction, and an A-phase winding 111, a B-phase winding 112, and a C-phase winding 113 in the outer winding 110 may be sequentially arranged in a clockwise direction. In other embodiments, the A-phase winding 121, B-phase winding 122, and C-phase winding 123 in the inner winding 120 may also be sequentially arranged in a clockwise direction, and the A-phase winding 111, B-phase winding 112, and C-phase winding 113 in the outer winding 110 may be sequentially arranged in the counterclockwise direction without limitation herein.

The inverter 200 may include a first current output terminal 210, a second current output terminal 220, and a third current output terminal 230. The A-phase winding of the outer winding 110 and the A-phase winding of the inner winding 120 may be connected in parallel to the first current output terminal 210, the B-phase winding of the outer winding 110 and the B-phase winding of the inner winding 120 may be connected in parallel to the second current output terminal 220, and the C-phase winding of the outer winding 110 and the C-phase winding of the inner winding 120 may be connected in parallel to the third current output terminal 230. In this way, the inverter 200 can precisely control each three-phase winding of the inner winding 120 and the control of the three-phase winding of the outer winding 110 can be automatically achieved at the same time.

In this embodiment, the stator 100 may include an inner stator 130 and an outer stator 140 disposed on a periphery of the inner stator 130. The inner winding 120 may be arranged on the inner stator 130, and the outer winding 110 may be arranged on the outer stator 140. The counter-rotating motor 10 may further include a magnetic barrier 500. The magnetic barrier 500 may be disposed between the outer stator 140 and the inner stator 130 and may be configured to magnetically isolate the outer winding 110 from the inner winding 120. The magnetic barrier 500 of this embodiment can be configured to magnetically isolate the outer winding 110 from the inner winding 120, thus avoiding the magnetic field interference between the outer winding 110 and the inner winding 120 that may affect normal operation of the counter-rotating motor 10.

In one embodiment, a power source (not shown) may supply power to the outer winding 110 and the inner winding 120 through the inverter 200 at the same time. The inner winding 120 may generate a first magnetic field in response to the excitation current to drive the permanent magnet rotor to rotate in the first direction. For example, in this embodiment, the first direction may be the clockwise direction, a voltage and frequency of the inner winding 120 may gradually increase, and a rotation speed of the permanent magnet rotor may gradually increase accordingly. The inverter 200 can precisely control a rotation speed or torque of the permanent magnet rotor by precisely controlling an output voltage, output current and output frequency of the inner winding 120, and achieving a closed-loop vector control of the inner winding 120. At the same time, the outer winding 110, which is connected to the inverter 200 in parallel with the inner winding 120, may also receive an excitation current to generate a second magnetic field. Since the phase sequence of the outer winding 110 is reverse to the phase sequence of the inner winding 120, the first squirrel cage rotor may be driven by the outer winding 110 to rotate in the second direction opposite to the first direction, for example, the second direction may be counterclockwise direction in this embodiment. A voltage and frequency of the outer winding 110 can gradually increase, and a rotation speed of the first squirrel cage rotor can gradually increase accordingly. Since a ratio of the output voltage to the output frequency is a constant when the closed-loop vector control of the inner winding 120 by the inverter 200 is achieved, the first squirrel cage rotor may automatically operate in the V/F open-loop control mode. When a load on the first squirrel cage rotor is larger, the first squirrel cage rotor may run at a lower rotation speed than a magnetic field synchronous speed through its own control, and generating a rotation difference. In this way, an asynchronous electromagnetic torque matching the load may be generated and risk of out of synchronization may be avoided.

Figure 3:
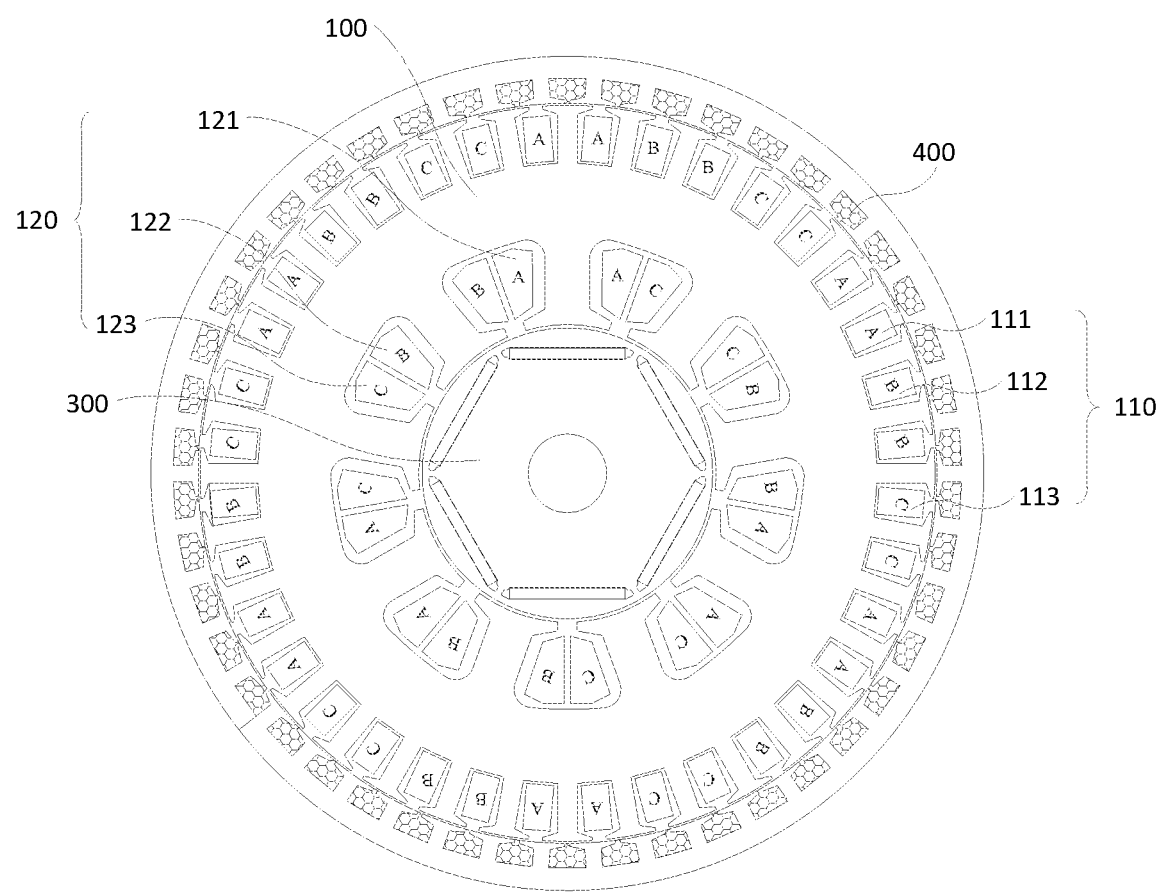
FIG. 3 is a structural view of a counter-motor according to another embodiment of the present disclosure.

With reference of FIG. 3, in another embodiment, the counter-rotating motor 10 may include a stator 100 structured as a single unit. The inner winding 120 may be arranged in an inner ring of the stator 100 and the outer winding 110 may be arranged on an outer ring of the stator 100. The inner winding 120 and the outer winding 110 may be precisely controlled to avoid the interference between the inner winding 120 and the outer winding 110. A control method in this embodiment may be more complicated than the above embodiment of a counter-rotating motor 10 with a magnetic barrier 500, but structure of the counter-rotating motor 10 may be simpler.

Figure 4:
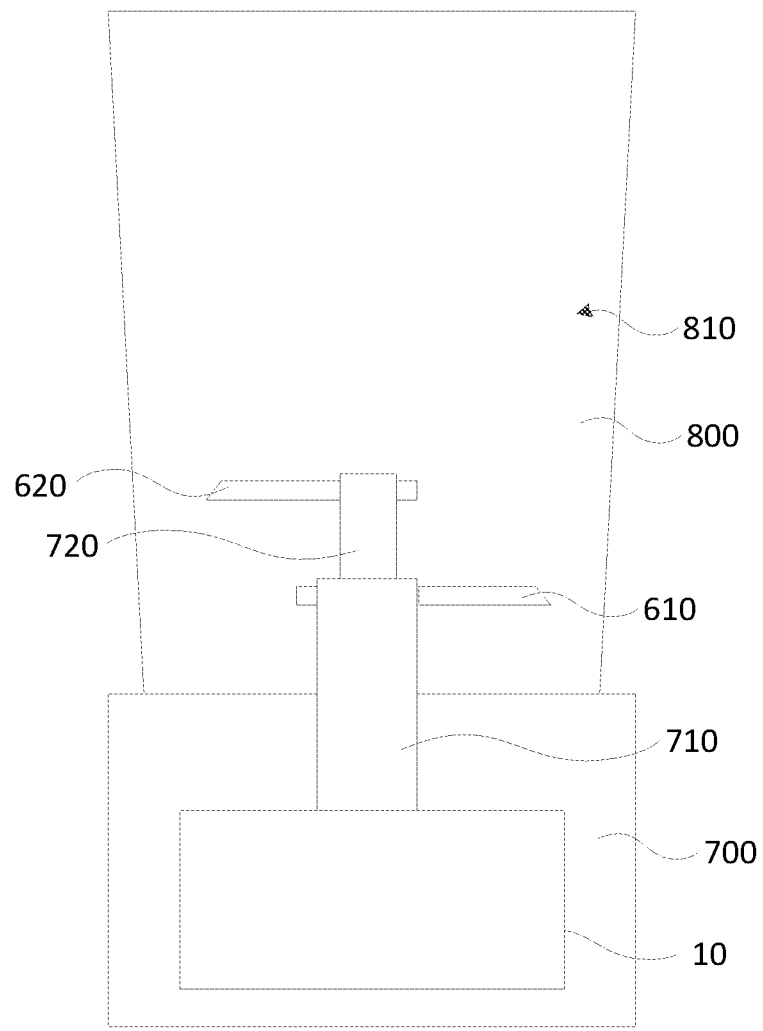
FIG. 4 is a structural view of a high speed blender according to an embodiment of the present disclosure.

Referring to FIG. 4, in an embodiment of the present disclosure, a high speed blender may include a counter-rotating motor 10, a first blade 610, and a second blade 620. Structure of the counter-rotating motor 10 is described in the above embodiments and will not be described herein. The first blade 610 may be connected to the inner rotor 300, and the second blade 620 may be connected to the outer rotor 400. In this way, the first blade 610 and the second blade 620 can counter-rotate relative to each other.

In detail, the high speed blender may further include a base 700, a first output shaft 710, a second output shaft 720, and a cup 800. The cup 800 may be arranged on the base 700 and define a receiving chamber 810. The counter-rotating motor 10 may be arranged in the base 700. The first output shaft 710 and the second output shaft 720 may penetrate through the base 700. The second output shaft 720 may be nested in the first output shaft 710. The first output shaft 710 may be fixedly connected to the inner rotor 300 and the first blade 610. The second output shaft 720 may be fixedly connected to the outer rotor 400 and the second blade 620. In this way, the first blade 610 may rotate with the inner rotor 300 and the second blade 620 may rotate with the outer rotor 400 and the first blade 610 and the second blade 620 may counter-rotate relative to each other, and a relative rotation speed between the first blade 610 and the second blade 620 can reach twice speed of a single blade. In this way, food received in the receiving chamber 810 can be better processed. In other embodiments, blades may be arranged on the first output shaft 710 and the second output shaft 720, without limitation herein.

The counter-rotating motor 10 of the high speed blender in the embodiments of the present disclosure may include an inner winding 120 and an inner rotor 300 matched with each other and an outer winding 110 and an outer rotor 400 matched with each other. In addition, one inverter 200 may be configured to control the outer winding 110 and the inner winding 120 synchronously. In this way, the brush can be eliminated, the noise can be reduced, the motor life can be increased, and since two inverters are not required, the cost can be lower and the control can be simpler. A blade 610 may be connected to the inner rotor 300 and another blade 620 to the outer rotor 400, and a relative rotation speed between the two blades 610, 620 can reach twice speed of a single blade, and processing efficiency can be improved without increasing noise.

What is claimed is:

1. A counter-rotating motor, comprising:
a stator, comprising an outer winding and an inner winding, wherein a phase sequence of the outer winding is reverse to a phase sequence of the inner winding;
an inverter, connected in parallel with the outer winding and the inner winding and configured to supply excitation current to the outer winding and the inner winding synchronously;
an inner rotor, arranged at an inner side of the inner winding and configured to rotate in a first direction by an action of the inner winding; and
an outer rotor, arranged at an outer side of the outer winding and configured to rotate in a second direction opposite to the first direction by an action of the outer winding;
wherein the inverter is configured to perform a closed-loop vector control of the second squirrel cage rotor, permanent magnet rotor, or reluctance rotor, the first squirrel cage rotor is configured to automatically operate in a V/F open-loop control mode.

2. The counter-rotating motor as claimed in claim 1, wherein the outer winding comprises a three-phase winding, the inner winding comprises a three-phase winding, a phase sequence of the three-phase winding in the outer winding is reverse to a phase sequence of the three-phase winding in the inner winding.

3. The counter-rotating motor as claimed in claim 2, wherein the outer winding comprises a plurality of three-phase windings, the inner winding comprises a plurality of three-phase windings, each three-phase winding of the outer winding has a same phase sequence, each three-phase winding of the inner winding has a same phase sequence.

4. The counter-rotating motor as claimed in claim 2, wherein each three-phase winding comprises an A-phase winding, a B-phase winding, and a C-phase winding, the A-phase winding, B-phase winding, and C-phase winding of the inner winding are sequentially arranged in a counter-clockwise direction, the A-phase winding, B-phase winding, and C-phase winding of the outer winding are sequentially arranged in a clockwise direction.

5. The counter-rotating motor as claimed in claim 4, wherein the inverter comprises a first current output terminal, a second current output terminal, and a third current output terminal, the A-phase winding of the outer winding is connected to the first current output terminal in parallel with the A-phase winding of the inner winding, the B-phase winding of the outer winding is connected to the first current output terminal in parallel with the B-phase winding of the inner winding, the C-phase winding of the outer winding is connected to the first current output terminal in parallel with the C-phase winding of the inner winding.

6. The counter-rotating motor as claimed in claim 1, wherein one of the inner rotor and the outer rotor is a first squirrel cage rotor, another of the inner rotor and the outer rotor is a second squirrel cage rotor, a permanent magnet rotor, or a reluctance rotor.

7. The counter-rotating motor as claimed in claim 1, wherein the stator comprises an inner stator and an outer stator disposed on a periphery of the inner stator, the inner winding is arranged on the inner stator, and the outer winding is arranged on the outer stator.

8. The counter-rotating motor as claimed in claim 7, further comprising a magnetic barrier, the magnetic barrier is disposed between the outer stator and the inner stator and is configured to magnetically isolate the outer winding from the inner winding.

9. A high speed blender, comprising:
a counter-rotating motor, comprising:
a stator, comprising an outer winding and an inner winding, wherein a phase sequence of the outer winding is reverse to a phase sequence of the inner winding;
an inverter, connected in parallel with the outer winding and the inner winding and configured to supply excitation current to the outer winding and the inner winding synchronously;
an inner rotor, arranged at an inner side of the inner winding and configured to rotate in a first direction by an action of the inner winding; and
an outer rotor, arranged at an outer side of the outer winding and configured to rotate in a second direction opposite to the first direction by an action of the outer winding;
wherein the inverter is configured to perform a closed-loop vector control of the second squirrel cage rotor, permanent magnet rotor, or reluctance rotor, the first squirrel cage rotor is configured to automatically operate in a V/F open-loop control mode.

10. The high speed blender as claimed in claim 9, further comprising a first blade and a second blade, the first blade is connected to the inner rotor, and the second blade is connected to the outer rotor and the first blade and the second blade can counter-rotate relative to each other.

* * * * *